Dec. 19, 1922.

J. H. POWRIE.

METHOD OF REGISTERING A PLATE FOR SUCCESSIVE PHOTOGRAPHIC PRINTINGS AND MASTER OR MODEL PLATE FOR SAME.

FILED JAN. 6, 1919.

Inventor:
John H. Powrie
by his Attys:

Dec. 19, 1922.

J. H. POWRIE.

METHOD OF REGISTERING A PLATE FOR SUCCESSIVE PHOTOGRAPHIC PRINTINGS AND MASTER OR MODEL PLATE FOR SAME.

FILED JAN. 6, 1919.

Inventor:
John H Powrie
by his Attys:

Patented Dec. 19, 1922.

1,439,325

UNITED STATES PATENT OFFICE.

JOHN H. POWRIE, OF NEW YORK, N. Y.

METHOD OF REGISTERING A PLATE FOR SUCCESSIVE PHOTOGRAPHIC PRINTINGS AND MASTER OR MODEL PLATE FOR SAME.

Application filed January 6, 1919. Serial No. 269,747.

*To all whom it may concern:*

Be it known that I, JOHN H. POWRIE, a citizen of the United States, residing at New York city, county of New York, and State of New York, have invented certain new and useful Improvements in Methods of Registering a Plate for Successive Photographic Printings and Master or Model Plate for Same, fully described and represented in the following specification and the accompanying drawings, forming a part of the same.

This invention relates to certain improvements in a method for registering a plate, film or similar article which is to have a pattern printed thereon in successive operations from a model or master plate so that the plate, film, etc., after one element of the pattern has been printed thereon, may be accurately registered by the eye with the model or master plate for a second print without other instrumentalities, and to the master or model plate per se by which the printing is effected, and the invention has been designed especially for the production of the fine lined tricolor screen plates or films used in color photography, and the invention will be described as employed in such screen production, though the method of registration and the master or model plate may be used in other relations and for other purposes.

In a prior United States Patent No. 802471, granted to me, Oct. 24, 1905, there is shown a color screen in which there are produced photographically on a plate recurring patterns of juxtaposed lines or bands of alternating green, red and blue colors. These bands or lines are of exceeding fineness, being from 200 to 400 to the inch, and may, for some purposes, be greatly in excess of such numbers. In the production of such a color screen, one set of lines was printed on the plate through a model or master plate having a series of printing lines and a series of opaque lines or bands twice the width of the printing lines. When the screen plate was exposed under this model or master plate, there was printed a series of lines with an unprinted space between twice the width of the printed lines. These lines were colored in one color, as, for instance, green. In printing the next series of lines from the master plate, it was necessary to shift these plates relatively to each other so as to cover up with the opaque portion of the printing plate the green printed lines, and to bring the printing line of the model or master plate in exact juxtaposition to the printed lines of the screen, so that the next line would be printed adjacent to and exactly parallel with the lines already printed. Owing to the fineness of the lines, registration by ocular perception alone was impossible with the plates as produced prior to this invention, and the registration had to be done under a high power microscope.

It is the especial object of the present invention to provide a method of registering by ocular perception alone a screen plate or film having one element of a design printed thereon in fine lines, dots or other regular recurring pattern with a model or master plate or film for a second printing, so that a screen plate with one design element printed thereon may be quickly and accurately registered, the method of registering and the master plate being such that the registration may be effected ocularly in spite of the fineness of the lines, thus doing away with the use of the microscope and rendering the printing of such plates commercially practicable.

Generally speaking, the invention will be carried out by producing on or near the margin of the master plate or model a registering patch or patches of alternating transparent and opaque elements which bear certain relation to the pattern to be printed and which at the first printing are reproduced in the margin of the screen plate, the screen plate being registered with the model by these patches for the second printing, the plates being shifted for the second printing to produce either an ocular perception of color in the margin, or an ocular perception of an absence of all color in the margin and the body of the screen plate, as more specifically described below.

With the objects referred to and others not specifically mentioned in view, the invention will be described in detail for a complete understanding thereof, in connection with the accompanying drawings, which have been designed to show, as far as it can be done, the registering method and the master plate for carrying the method into effect.

In the drawings—

Figure 1:
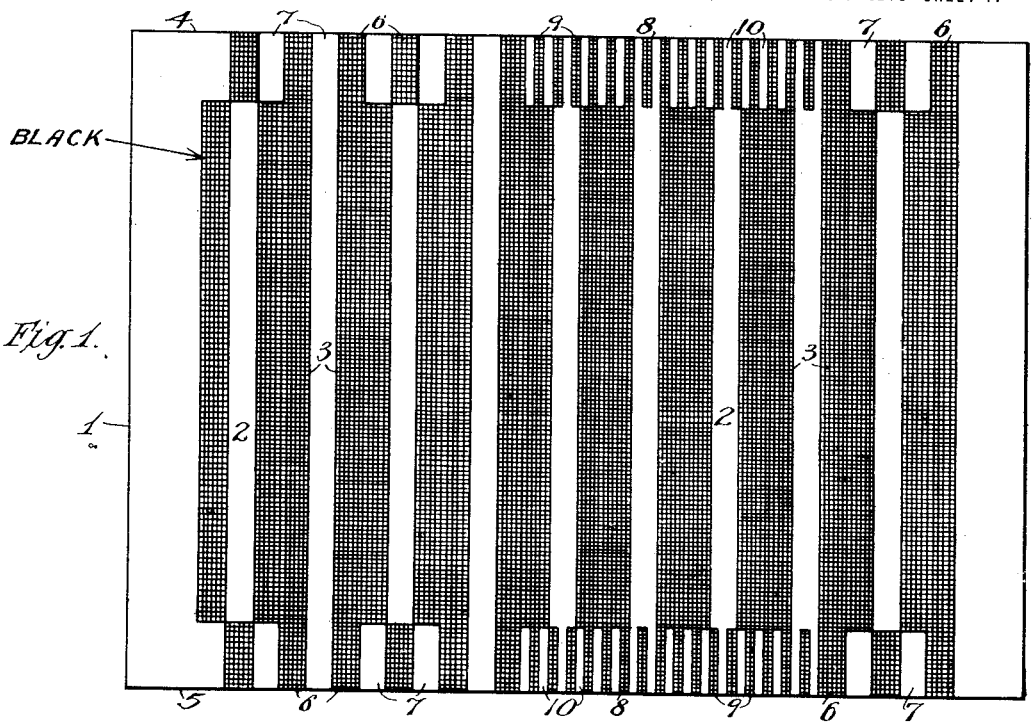
Figure 1 is a face view of the novel master or model plate for printing the screen with recurring parallel lines or bands showing the registering patches in two opposite margins, the lines or bands being shown on a very much enlarged scale for the purpose of clarity.

Referring now to the drawings in detail, the invention has been illustrated as employed in the production of a tricolor lined screen plate, in which either juxtaposed parallel lines of green, red and blue succeed each other across the plate, as shown in Figs. 1 to 4, or parallel lines having a blue line on each side of the red follow across in juxtaposed position, though it will be understood that the invention may be employed in the production of two colored screen plates and in the production of certain products other than color screens.

In the specific embodiment of the invention illustrated there is provided a model or master plate from which the screen plate is printed photographically, as described in my prior patent above referred to. This model may be formed on any suitable surface, such as a glass plate or a film. As shown, it is formed on a plate glass marked 1. The model or master plate illustrated is intended for use in printing a pattern consisting of parallel juxtaposed lines which will be green, red and blue. The lines to be printed as shown in Figs. 1 to 4 are of substantially equal width and recur in the order of the colors named across the plate.

The master or model plate has formed, preferably photographically, on its surface alternately transparent printing bands or lines 2 and opaque bands 3, these latter bands being impervious to light and shown as black. The opaque bands will be, where the plate is to be used for producing a three color lined screen, twice the width of the transparent or printing bands 2, the proportion of the opaque lines to the transparent lines being 2 to 1, and a pattern or design including one of these transparent lines or bands and one opaque band will be termed the interval of the body of the plate.

The master or model plate 1 has formed in two opposite margins and preferably extending across the plate registering patches, these patches being preferably of two characters, as hereinafter referred to, and including alternating transparent and opaque elements. Along the two opposite margins, as 4, 5 of the plate, except for a small space in the center, there are formed alternate transparent and opaque patches in the form of lines or bands, the opaque lines which are shown as black being marked 6, and the transparent lines or bands or spaces being marked 7. These opaque and transparent registering bands are each one third of the interval of the plate and an opaque and a transparent band may be conveniently termed the margin interval, this margin interval in the plate illustrated in Figs. 1 to 4 being two thirds of the interval of the body portion of the plate. These proportions, of course, may be widely varied, but it has been found in actual practice in producing a three color screen plate that a margin interval of two thirds of the body interval produces good results.

While the master or model plate formed with a registering interval two thirds of the body interval, as above described, is effective and can be used for carrying out the invention, for very great accuracy and particularly where a plate with a great number of lines to the inch is to be printed, in the best practice of the invention the plate is provided with what may be termed auxiliary registering patches. As illustrated, these auxiliary patches are formed centrally in two opposite margins of the plate, these patches being preferably opposed to each other and being generally marked 8. This auxiliary patch is formed by producing in the margin alternate opaque and transparent patches in the form of bands or lines. The bands or lines of the auxiliary patch are finer than the margin intervals before referred to, but they will bear a certain definite proportion or relation to the interval of the body of the plate. This proportion may be varied, of course, within wide limits, but in the particular construction illustrated there are nine opaque and transparent bands to a body interval, these being marked, respectively, 9, 10. This auxiliary patch with a very small margin interval relatively to the body interval enables an exceedingly accurate ocular registration of the plate.

In carrying out the invention, a plate coated with a substance sensitive to light, such as bichromated gelatin, is superposed on the model or master plate, exposed, and the lines, rendered insoluble by the action of the light, dyed with a suitable green dye. This will produce the plate shown in Fig. 2, in which the body of the plate is printed with green lines 11, separated by clear spaces 12, twice the width of the printed lines, and the margin intervals 13 and auxiliary margin intervals 14 are produced in a green color, and in proper relation with the body intervals.

The plate is again coated with a suitable light sensitive substance as bichromated gelatin, and is again superposed on the model or master plate, in the position in which it was originally printed; that is, so that the body of the plate and the margin patches show a green color throughout. It is now necessary to shift the plates relatively to each other to bring the printed green lines under the opaque lines of the master or model plate, leaving the printing lines of the master or model plate in exact juxtaposition to the lines printed on the screen plate for the second printing.

Figure 3:
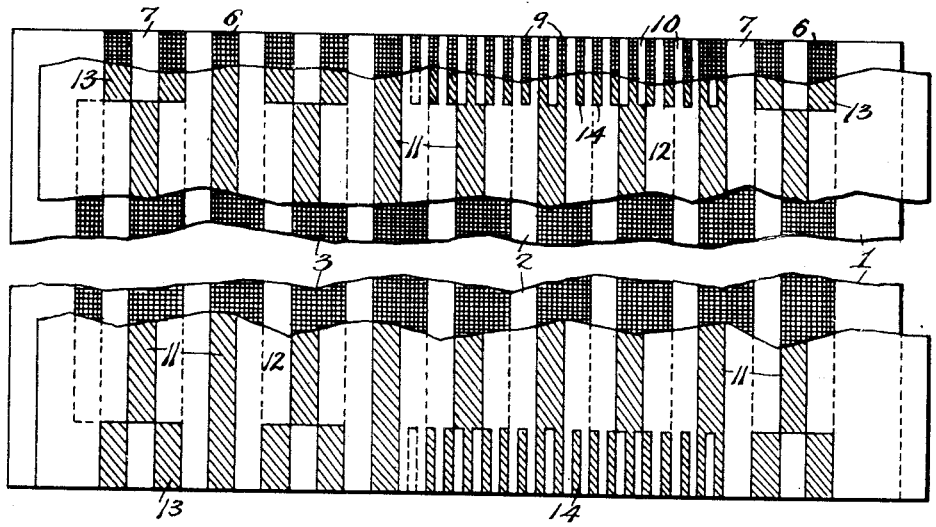
Figure 3 is a divided face view partly broken away showing the screen plate with the green lines printed thereon superposed on the master plate in shifted or registered position ready for the printing of the second series of lines in juxtaposition to the printed green lines and on the left side thereof, the parts being shown on the same scale as Fig. 1.
Figure 4:
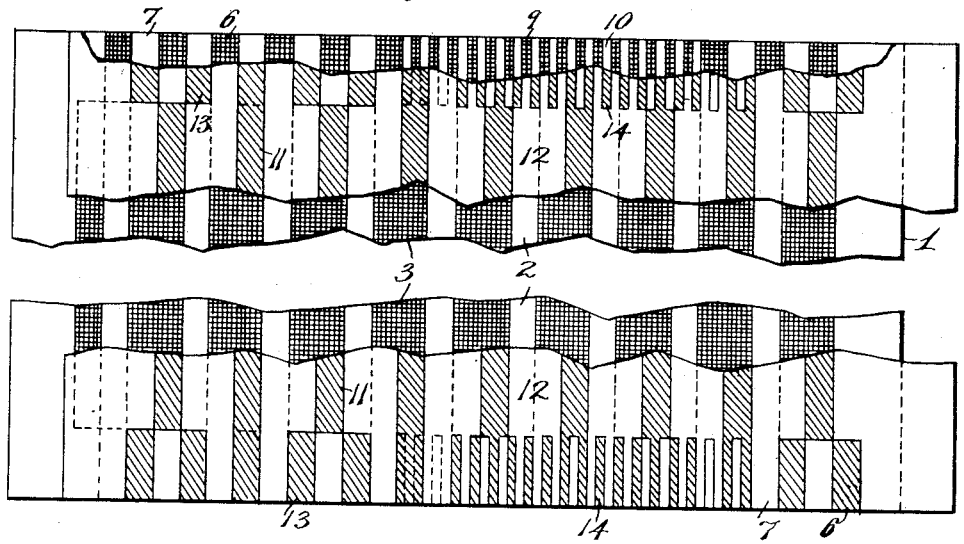
Figure 4 is a view similar to Fig. 3, and on the same scale, showing the position the two plates occupy relatively to each other when in registered position for printing the second series of lines in juxtaposition to the first printed lines, but on the right hand side thereof.

This may be effected either as illustrated in Fig. 3, or as shown in Fig. 4. Referring first to Fig. 3, the operator, through any suitable devices, which form no part of the present invention, shifts the plates relatively to each other, preferably shifting the screen plate relatively to the master or model plate. As shown in Fig. 3, he shifts the plate slightly to the right until no color appears either in the main and auxiliary margin patches or in the body of the plate. The plate has thus been shifted one half a main margin interval but only a third of a plate body interval. By this movement, the green marginal patches 11 are now covered up by the opaque bands of the model plate and the printed green lines have been moved so that they now are covered by the left halves of the opaque bands of the body of the master plate, the plate in this position showing no color and indicating to the operator that the plates are in position to bring the next printing lines in exact juxtaposition to the first lines printed, the margin patches on the top and bottom of the plate permitting the plate to be squared up truly, so that the superposed lines of the screen plate and the master plate are parallel.

Figure 2:
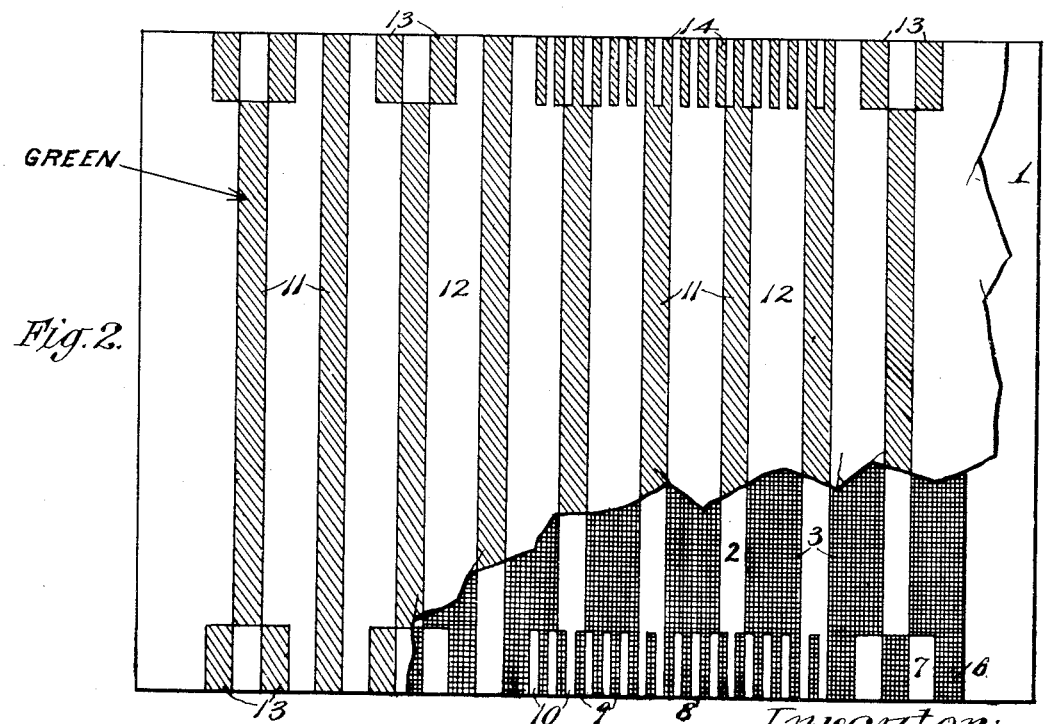
Figure 2 is a face view of the screen plate superposed on the master plate, the screen plate being partly broken away, in the position of the plates where the first lines (green) have been printed, the scale being the same as that of Fig. 1.

If desired, and for better ocular perception, the plates may be shifted as shown in Fig. 4, in which the screen plate from the position shown in Fig. 2 is moved to the right a full margin interval and two thirds of a body interval. When in this position, the margin patches, both main and auxiliary, will show green and the body of the plate will show no color, indicating that the plate has been moved far enough to bring the green printed lines of the body of the plate under the opaque lines of the body of the master plate, in this instance the right hand halves of the opaque lines, and bring the lines to be printed in juxtaposition to the printed green lines on the right hand side thereof.

The second lines are then printed and dyed a suitable color, as red. After this has been set the plate is again coated and the third series of lines are printed in the interval left in the remaining third of the body interval, no registration being necessary to effect this.

Figure 5:
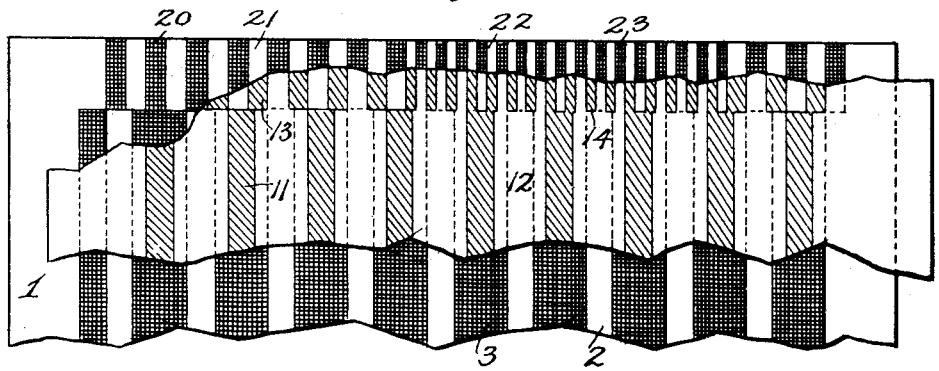
Figure 5 is a view similar to Fig. 3, showing a modification of the registering patches which may be employed to register the plates so that the second series of lines may be printed exactly midway of the first printed lines.
Figure 6:
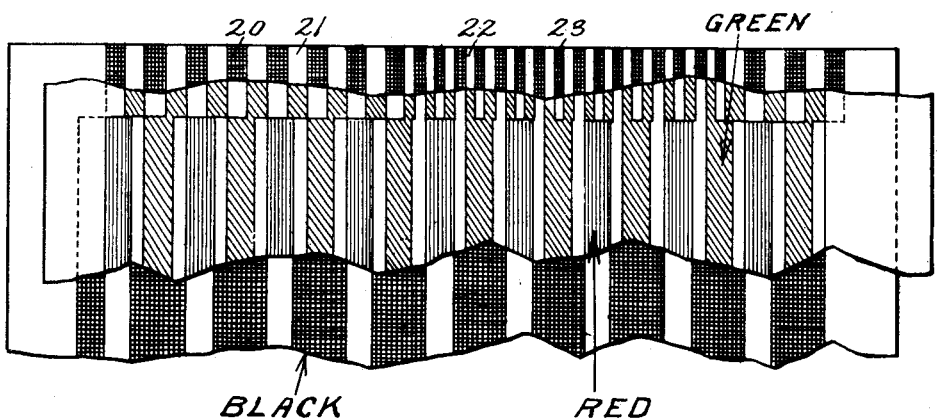
Figure 6 is a view similar to Fig. 5, showing the second lines printed midway of the first printed lines.

Under some circumstances it may be desirable to split the blue lines, that is to say, to print a blue line on each side of each red line between it and the green of one half the width of the green and red lines. To effect this, the red lines are printed second midway between the green lines. In Figures 5 and 6 is illustrated a modified spacing of the registering patches by which this registration may be effected by ocular perception. As shown, here the interval of the main registering patches comprising an opaque and a transparent band 20 and 21, respectively, is one-half of the interval of the plate body, and the auxiliary registering patches have four transparent bands 22 and four opaque bands 23 to a plate body interval. The method of registration and of printing the plate is similar to that already described, the plates being shifted for registration until the main and auxiliary patches show the color first printed without show of color in the body of the plate.

It will thus be seen that a very simple but effective method of accurately registering a lined plate for printing a second series of lines thereon by ocular perception alone has been provided by the use of the marginal patches divided up into intervals smaller than the intervals of the body of the plate. While the proportion and arrangement shown are convenient ones, and have proven by practice to produce good results, it will be understood that the invention is in nowise restricted to the relative proportion of the margin intervals and the plate body intervals shown, but that such proportions can be varied as desired to effect the result. It will be further understood that the invention is not restricted to the production of a color screen in which the pattern is a recurring one of parallel lines, but that it may be used equally well in the production of screens having any regular recurring pattern of lines, dots or figures. It will be further understood that the terms "screen element" and "sensitized surface" as used in the claims will include a screen made on a plate, film or the like, and a sensitive surface which may be a plate, film or other surface capacitated to carry a sensitized coating, and the claims should be so interpreted.

What is claimed is:

1. The method of producing screen elements which consists in photographically printing onto a sensitized member from a model, an element of a design, and a registering patch of alternating transparent and opaque elements, registering the printed member with the model by the ocular appearance of the registering patches to enable another element of the design to be printed in determined relation with the one first printed, and then printing another element of the design while the model and sensitized member are in registering position.

2. The method of producing screen elements which consists in photographically printing onto a sensitized member from a model, an element of a design, and a registering patch of alternating transparent and opaque elements similar to the elements of the design but of a different proportion therefrom, registering the printed member with the model by the ocular appearance of the registering patches to enable another element of the design to be printed in determined relation to the one first printed, and then printing another element of the design while in registered position.

3. The method of producing screen elements which consists in photographically printing onto a sensitized member from a model an element of a design, a main registering patch of alternating transparent and opaque elements, and an auxiliary registering patch of transparent and oqaque elements of different proportions from the elements in the main patch, registering the printed member with the model by the ocular appearance of the registering patches to enable another element of the design to be printed in determined relation to the one first printed, and then printing another element of the design while in registered position.

4. The method of producing screen elements which consists in photographically printing onto a sensitized member from a model an element of a design and a registering patch having alternately transparent and opaque elements, registering the printed member with the model by the ocular appearance of the registering patches to enable another element of the design to be printed juxtaposed to the one first printed, and then printing another element of the design while in registered position.

5. The method of producing screen elements which consists in printing from a model an element of a design on a sensitized member and registering patches in each margin, each patch composed of alternately transparent and opaque elements of different proportions from the design element, and an auxiliary registering patch in each margin composed of alternately transparent and opaque elements different in proportions from those of the main patches, registering the printed member with the model by the ocular appearance of the registering patches to enable another element of the design to be printed in determined relation to the one printed, and then printing another element of the design while in registered position.

6. The method which consists in photographically printing on a sensitized member from a model one element of a design, and a registering patch of transparent and opaque elements, registering the printed sensitized member with the model by the ocular appearance of the registering patches, and then printing another element of the design while the model and sensitized member are in registered position.

7. A model for photographically printing a design having a body portion of alternate transparent and opaque areas extending substantially over the entire printing surface of the model for printing one element of a design, and a registering patch of alternate transparent and opaque elements through which a similar registering patch may be printed on a sensitized member.

8. A model for photographically printing a design having a body portion of alernate transparent and opaque areas for printing one element of a design, a main registering patch of alternate transparent and opaque elements, and an auxiliary registering patch adjacent the main patch having alternate transparent and opaque elements of a different proportion from the elements of the main patch, through which registering patches a similar registering device may be printed on a sensitized member.

9. The method of producing screen elements which consists in photographically printing from a model a series of spaced parallel lines on a sensitized member and a registering patch at a side thereof, registering the printed member with the model by the ocular appearance of the registering patches to enable a second series of lines to be printed in determined relation to the one first printed and then printing a second series of lines while the model and sensitized member are in registered position.

10. The method of producing screen elements which consists in photographically printing on a sensitized member from a model a series of parallel lines spaced from each other twice the width of a line and a registering patch at a side thereof, registering the printed member with the model by ocular appearance of the registering patches to enable a second series of lines to be printed between the lines of the first series leaving unprinted areas, printing a second series of lines while the model and sensitized member are in registered position and then printing a third series of lines in the areas not occupied by the first two series printed.

11. The method of producing screen elements which consists in photographically printing from a model an element of a design on a sensitized member and a registering patch, registering the printed member with the model by the ocular appearance of the registering patches to enable another element of the design to be printed in determined relation to the one first printed, and then printing another element of the design while the model and sensitized member are in registered position.

12. A model for photographically printing a design having a body portion of alternate transparent and opaque parallel lines extending substantially over the entire printing surface of the model for printing a series of lines, and a registering patch of alternate transparent and opaque lines of different proportions through which a similar registering patch may be printed on a sensitized member.

13. A model for photographically printing a design having a body portion of alternate transparent and opaque areas extending substantially over the entire printing surface of the model for printing one element of the design, and a registering patch in each margin of the model of alternate transparent and opaque elements through which a similar registering patch may be printed on a sensitized member.

14. A model for photographically printing a design having a body portion of alternate transparent and opaque parallel lines extending substantially over the entire printing surface of the model for printing a series of lines, and a registering patch in each margin of the model of alternate transparent and opaque lines of different proportions, through which a similar registering patch may be printed on a sensitized member.

In testimony whereof, I have hereunto set my hand.

JOHN H. POWRIE.